United States Patent
Perthold et al.

(10) Patent No.: US 9,438,357 B2
(45) Date of Patent: Sep. 6, 2016

(54) CALIBRATION DEVICE, SIGNAL PROCESSING DEVICE, AND USER INTERFACE FOR THE SAME

(71) Applicant: Innovationszentrum fuer Telekommunikationstechnik GmbH IZT, Erlangen (DE)

(72) Inventors: Rainer Perthold, Weisendorf (DE); Oliver Rommelfanger, Nuremberg (DE); Ralf Gick, Nuremberg (DE)

(73) Assignee: Innovationszentrum Fuer Telekommunikationstechnik GMBH IZT, Erlangen (DE)

( * ) Notice: Subject to any disclaimer, the term of this patent is extended or adjusted under 35 U.S.C. 154(b) by 0 days.

(21) Appl. No.: 14/639,387

(22) Filed: Mar. 5, 2015

(65) Prior Publication Data
US 2015/0288463 A1 Oct. 8, 2015

Related U.S. Application Data

(63) Continuation of application No. PCT/EP2013/068369, filed on Sep. 5, 2013.

(30) Foreign Application Priority Data

Sep. 6, 2012 (DE) .................. 10 2012 215 820

(51) Int. Cl.
*H04K 1/02* (2006.01)
*H04L 25/03* (2006.01)
(Continued)

(52) U.S. Cl.
CPC .............. *H04B 17/13* (2015.01); *H04B 17/14* (2015.01); *H04B 17/21* (2015.01); *H04B 17/24* (2015.01); *H04B 17/3911* (2015.01)

(58) Field of Classification Search
CPC ...... H04B 17/13; H04B 17/21; H04B 17/14; H04B 17/24

USPC ............... 375/296, 297; 455/114.2, 114.3; 330/98, 99, 100
See application file for complete search history.

(56) References Cited

U.S. PATENT DOCUMENTS 7,313,198 B2 * 12/2007 Rahman .............. H04L 27/0014
375/295
7,542,738 B2 * 6/2009 Posamentier .......... H01Q 1/362
455/114.3

(Continued)

FOREIGN PATENT DOCUMENTS

DE 2641783 A1 3/1978

OTHER PUBLICATIONS

International Search Report in co-pending PCT Application No. PCT/EP2013/068369 dated Oct. 9, 2013, 3 pages.

(Continued)

*Primary Examiner* — Phuong Phu
(74) *Attorney, Agent, or Firm* — Allen J. Moss; Squire Patton Boggs (US) LLP

(57) ABSTRACT

Calibration device for a signal processing device including an input stage, a signal processing stage and an output stage includes an output stage calibrator. The output stage calibrator includes a test signal source adapted to be coupled to the output stage, a feedback channel connectable between output of the output stage and input of the input stage, and a signal analyzer which couples to the input stage. The test signal source provides a test signal to the output stage which is supplied to the input stage via the feedback channel after processing. The signal analyzer analyzes the test signal after processing by the input stage and determines, based on analysis, deviations of actual output amplification of the output stage at a set output amplification of the output stage and/or deviations of actual input amplification of the input stage at a set input amplification of the input stage.

16 Claims, 4 Drawing Sheets

(51) Int. Cl.
*H04L 25/49* (2006.01)
*H04B 17/13* (2015.01)
*H04B 17/391* (2015.01)
*H04B 17/14* (2015.01)
*H04B 17/21* (2015.01)
*H04B 17/24* (2015.01)

(56) References Cited

U.S. PATENT DOCUMENTS

| | | | |
|---|---|---|---|
| 7,564,899 B2* | 7/2009 | Kuijk | H04B 3/141 375/229 |
| 8,310,304 B1 | 11/2012 | Vagher et al. | |
| 2005/0168277 A1 | 8/2005 | Boos | |
| 2005/0270092 A1* | 12/2005 | Bailey | H03F 3/45928 330/9 |
| 2010/0041353 A1 | 2/2010 | Alford et al. | |
| 2011/0050346 A1 | 3/2011 | Schroth et al. | |

OTHER PUBLICATIONS

Zumkeller et al.; "Fadingkanal-simulator FADICS," *RFE Radio Fernsehen Elektronik*, HUSS Medien GmbH, Berlin, Germany, Jan. 1, 1991; 40(10):596-598.

* cited by examiner

CALIBRATION DEVICE, SIGNAL PROCESSING DEVICE, AND USER INTERFACE FOR THE SAME

CROSS-REFERENCE TO RELATED APPLICATIONS

This application is a continuation of copending International Application No. PCT/EP2013/068369, filed Sep. 5, 2013, which is incorporated herein by reference in its entirety, and additionally claims priority from German Application 102012215820.0, filed Sep. 6, 2012, which is also incorporated herein by reference in its entirety.

BACKGROUND OF THE INVENTION

Embodiments of the present invention relate to a calibration device, a signal processing device for an HF signal and to a user interface for the signal processing device as well as a method for calibrating and operating the same.

Signal processing devices are, for example, channel or payload simulators where an HF signal (high frequency signal) is fed in and output again in modified form. The modifications applied to the HF signal correspond approximately to the signal changes that would result when transmitting the HF signal under real conditions via a channel (such as a telecommunication channel or a satellite connection) due to spurious influences. In that way, such signal processing devices can simulate how an HF signal would reach the receivers after transmission via a channel (signal path). In the following, such a signal processing device or such a channel simulator according to conventional technology will be discussed based on FIG. 3.

FIG. 3 shows a channel simulator 10 having an input stage 12, a signal processing stage 14 and an output stage 16. The input stage 12 can, for example, comprise an analog-to-digital converter, a signal mixer, amplification elements and attenuation elements (not shown). Analogously, the output stage 16 comprises a digital-to-analog converter and further amplification or attenuation elements (not shown). Since signal processing is performed in a digital manner, i.e., after converting a real power (in dBm) into a digitally represented number (dB), the signal processing device 14 is implemented in the form of a digital addition mixer.

For simulating a transmission path with the signal simulator 10, the input stage 12 is provided with an ideal HF signal 18 (payload signal), which is digitized with the analog-to-digital converter 12a. In the signal processing stage 14, the digitized payload signal is modified according to a modification signal 20, or subject to different spurious influences, such as noise, nonlinear distortions, linear distortions (filter), or amended according to a channel module for multi-path propagation. For this, for example, the payload signal is superimposed by the modification signal 20 and subsequently converted again into an analog HF signal in the output stage 16 and output as simulated signal 22 (including the modification portions 20). Since the signal processing device 10 only has a limited control range, typically, the level of the payload signal 18 is adapted in the input stage 12 or in the output stage 16 by means of amplification or attenuation elements. Thus, the payload signal 18 can be transmitted from the input to the output with an adjustable defined amplification (after calibration). Amplification adaptation of the payload signal 18 is performed, for example, such that during analog-to-digital conversion in the analog-to-digital converter of the input stage 12, and during digital-to-analog conversion of the combined payload signal in the output stage 16, a good signal/noise ratio is obtained. Here, it has to be noted in particular that the power of the sum signal during signal processing (cf. signal processing stage 14) of the payload signal 18 can and should normally be amended.

Here, the approximate amplification of the input stage 12 and the output stage 16 is adjusted by the user. An exact control of the signal level is only possible with the help of external measurement equipment. Thus, the user can only indirectly determine whether the selected amplification adjustment is appropriate. A further conventional solution is the automatic gain control (AGC) illustrated in FIG. 3. The same is arranged between input stage 12 and signal processing stage 14 and thus regulates the amplification of the payload signal 18 in the digital domain. For this, the automatic gain control 13 comprises a multiplication mixer 13a and an amplification element 13b which is implemented to measure the digitized payload signal 18 (power detection) and to compare the same to internally generated signals. In the next step, the amplification element 13b provides the mixer 13a with an amplification signal, such that the digitized payload signal can be adapted. For controlling the adaptation, the signal for power detection is typically branched off after the mixer 13a in the amplification element 13b such that a feedback loop is formed in the digital domain. In other words, the mixer 13a of the automatic gain control 13 changes the digital values representing a real power (e.g., in dBm) such that no amplification in the classical sense takes place, but only conversion of the digital signal values for the HF signal 18. Switching the amplification or provision with an amplification signal mostly results in an undesirable interference of the payload signal 18. Further, undesirable cross sensitivities result in the sense that, for example, adding a modification signal 20 simultaneously reduces the power of the payload signal at the output. Further, the control of the input hardware is not at an optimum, since the correct control is only adapted subsequently in a digital manner and spurious signals as well as noise levels contribute to the amplification. All internally generated signals 20 which were added to the payload signal 18, corrupt the output power (which has been determined, for example, prior to determining a test signal). Thus, the user has to subsequently calculate level changes by the modification signal 20, since the signals 20 additionally added by the user are not considered when setting the amplifications. Thus, there is a need for an improved approach.

SUMMARY

According to an embodiment, a calibration device for a signal processing device including an input stage, a signal processing stage and an output stage, may have: an output stage calibrator including a test signal source adapted to be coupled to the output stage, a feedback channel connectable between output of the output stage and input of the input stage, and a signal analyzer adapted to be coupled to the input stage, wherein the test signal source is implemented to provide a test signal to the output stage, which can be supplied to the input stage via the feedback channel after processing by the output stage, wherein the signal analyzer is implemented to analyze the test signal after processing by the input stage and to determine, based on the analysis, deviations of an actual output amplification of the output stage at a set output amplification of the output stage and/or deviations of an actual input amplification of the input stage at a set input amplification of the input stage, wherein the calibration device includes an input stage calibrator, which includes a calibration signal source adapted to be coupled to the input of the input stage and the signal analyzer adapted to be coupled to the input stage, wherein the calibration signal source is implemented to provide a calibration signal to the input stage, wherein the signal analyzer is implemented to analyze the calibration signal after processing by the input stage and determine, based on the analysis, deviations of an actual input amplification of the input stage at a set input amplification of the input stage.

According to another embodiment, a method for calibrating a signal processing device including an input stage, a signal processing stage and an output stage, may have the steps of: calibrating the output stage with the substeps providing a test signal to the output stage, returning the test signal to the input stage after processing by the output stage and analyzing the test signal after processing by the input stage to determine deviations of an actual output amplification of the output stage at a set output amplification of the output stage and/or deviations of an actual input amplification of the input stage at a set input amplification of the input stage, wherein the method includes the step of calibrating the input stage prior to calibrating the output stage, wherein calibrating the input stage includes the substeps of providing a calibration signal to the input stage and analyzing the calibration signal after processing by the input stage, in order to determine deviations of an actual input amplification of the input stage at a set input amplification of the input stage, wherein the deviations of the actual input amplification are considered in the step of calibrating the output stage.

Another embodiment may have a computer program having a program code for performing the inventive method when the program runs on a computer.

Embodiments provide a calibration device for a signal processing device comprising an input stage (with adjustable input amplification), a signal processing stage and an output stage (with adjustable output amplification). Additionally, the calibration device comprises at least one output stage calibrator including a test signal source adapted to be coupled to the output stage, a feedback channel connectable between output of the output stage and input of the input stage, and a signal analyzer adapted to be coupled to the input stage. This signal source is implemented to provide a test signal to the output stage, which is supplied to the input stage via the feedback channel after signal processing by the output stage. The signal analyzer is implemented to analyze the test signal after signal processing by the (possibly already calibrated) input stage and to determine, based on the analysis, deviations of an actual output amplification of the output stage at a set output amplification of the output stage and/or deviations of an actual input amplification of the input stage at a set input amplification of the input stage. Since the test signal is transmitted both via the output stage and the input stage, prior to the analysis of the same, deviations of the output and input stage and, when knowing the deviations of input stage or a calibrated input stage the deviations of the output stage can be determined, such that these deviations can be compensated in a subsequent step.

Embodiments of the present invention are based on the knowledge that both the amplification of the input stage and the amplification of the output stage result in undesired signal influences. The same can be determined in the form of set-actual deviations during calibration, such that the undesired influences of the input and output stage or the deviations resulting in the same (for example as a result of component tolerances, aging or temperature effects) can be compensated. Calibration is performed such that a test signal is supplied to a signal analyzer via the output stage and the input stage, wherein deviations occurring in the transmission chain (output and input stage) result from the ratio of the measured signal level and the known test signal of the test signal source. Thus, starting from an already calibrated input stage at an already selected set input amplification of the same (depending on the HF signal to be processed), with selected set output amplification, the deviations of the actual output amplification of the output stage can be directly detected.

Thus, according to further embodiments, the calibration device comprises an input stage calibrator that is implemented to determine, by means of the signal analyzer, deviations of an actual input amplification of the input stage at a selected set input amplification of the input stage. For this, the signal analyzer analyzes a calibration signal which originates from a calibration signal source coupled directly to the input of the input stage.

According to further embodiments, based on the deviations of the output and input stage, a calibration data set can be determined, based on which the deviations of the actual output amplification of the respective set output amplification and the actual input amplification at the respective set input amplifications can be compensated by means of an amplification element of the signal processing device. This amplification element can either be a separate amplification element in the transmission chain between input and output stage or an already existing amplification element, such as an amplification element of the input stage. Thus, it is advantageously possible to compensate deviations caused by temperature variations, aging or component tolerances both on the input side and the output side. The method for determining the calibration data can also be performed in an automated manner, since it does not necessitate user interaction. For automating the amplification adjustment or the calibration further, according to further embodiments, the signal analyzer can be implemented such as to analyze an HF signal to be processed as regards to its signal level and to select, based on the analysis result, the amplification of the input stage accordingly, such that the signal processing device can be operated in the correct control range.

Further embodiments relate to a user interface for user-friendly adjustment of the set input amplification and set output amplification, which allows defining the same based on previously determined input reference level and output reference levels. Further, according to further embodiments, transmission amplification can be defined by the user, such that the amplification of the HF signal to be processed can be additionally adapted in the signal processing path.

Further embodiments relate to a signal processing device comprising an input stage with adjustable set input amplification, an output stage with adjustable set output amplification, a signal processing stage between input and output stage and a memory having first calibration data stored thereon. Based on these first calibration data, at least deviations of the actual output amplification of the output stage can be compensated for each set output amplification of the same. Advantageously, the calibration data stored in the memory also include second calibration data, based on which additionally deviations of an actual input amplification of the input stage for each set input amplification can be compensated, or combined calibration data where the first and second calibration data are combined.

Further embodiments provide a method for calibrating the above signal processing device. The method comprises calibrating the output stage with substeps "providing a test signal to the output stage", "returning the test signal to the input stage after processing by the output stage" and "analyzing the test signal after processing by the input stage" in order to determine deviations of an actual output amplification of the output stage and/or deviations of an actual input amplification of the input stage.

A further embodiment provides a method for operating such a signal processing device with the steps "determining a signal level of an HF signal to be processed", to select, based on the same, a set input amplification of the input stage, "selecting first and second calibration data based on the determined signal level and/or based on the frequency range of the HF signal to be processed". Further, the method comprises the step of "changing the HF signal to be processed or superimposing the HF signal to be processed with a correction signal according to the selected first and second calibration data" in order to compensate, when processing the HF signal, deviations of an actual output amplification of the output stage at a specific set output amplification at the output stage and deviations of an actual input of the input stage at a specific set input amplification of the input stage.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed in more detail below based on the accompanying drawings, it should be noted that similar and equal elements are provided with the same reference numbers, such that the description of the same is inter-exchangeable or can be applied to one another.

Figure 1A:
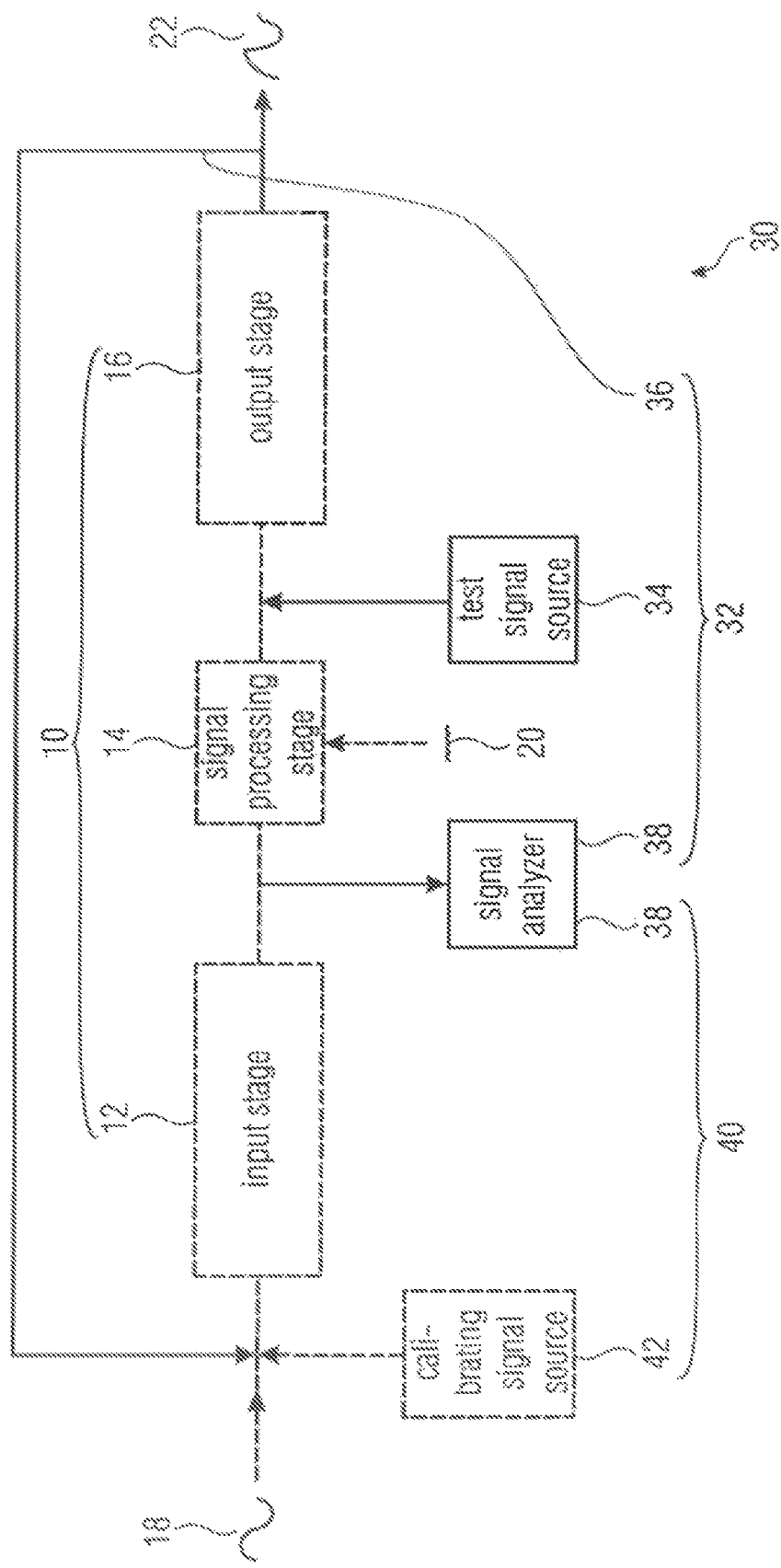
FIG. 1a is a schematic block diagram of a calibration device for a signal processing device according to an embodiment.

FIG. 1a shows a calibration device 30 for a signal processing device 10 (e.g. a channel or payload simulator or part of a spectral analyzer) comprising an input stage 12, a signal processing stage 14 and an output stage 16 (dotted elements). According to the above statements, the input stage 14 can comprise an adjustable amplifier and an analog-to-digital converter, wherein the output stage 16 can comprise a digital-to-analog converter and another adjustable amplifier. Since signal processing is performed in a digital manner, the signal processing stage 14 can be implemented, for example as addition mixer or multiplication mixer in order to add, for example, a modification signal 20.

In the simplest implementation of an output stage calibrator 32, the calibration device 30 comprises a (digital) test signal source 34, a feedback channel 36 and a signal analyzer 38. The test signal source 34 is connected to the output stage 16 on the input side, i.e., is coupled into the signal processing device 10 between the signal processing stage 14 and the output stage 16. On the output side, the feedback channel 36 connects the output stage 16 to the input of the input stage 12, such that a feedback loop is formed. The signal analyzer is connected to the output of the input stage 12, i.e. the same taps off the (digital) signal of the input stage 12 prior to the signal processing stage 14, and is implemented to evaluate the digital values for the signal (test signal or HF signal 18) applied to the input side and thus to determine the level of the signal applied to the input side.

Starting from an already calibrated input stage 12 or already known deviations of the input stage 12, the deviations of an actual output amplification of the output stage 16 at a respective or selected set output amplification can be determined by means of a measurement with a known test signal (e.g., an alternating signal or sinusoidal signal having a frequency f adapted to the HF signal to be processed) of the test signal source 34. Here, it should be noted that the deviations depend on a respective frequency of the test signal. Thus, the test signal of known control is selected such that the same is equal to or comparable to the payload signal 18 to be transmitted, or in particular to the frequency range of the signal 18 to be transmitted. Further, deviations depend on the selected output and input amplifications, since the amplification elements of the input and output stage might not show linear behavior. Thus, calibration is performed for each input and output amplification stage, which are again selected in dependence on the HF signal 18 and the simulated HF signal 22 to be output.

Thus, after selecting the suitable amplification adjustment (set output amplification) of the output stage 16, the output stage calibrator 32 determines the maximum output power by means of the signal analyzer 38. This determined value is referred to as output reference level and represents the actual output level for the respective set output amplification (and the set input amplification).

The deviation of the actual output amplification from the set output amplification is determined by the ratio between output reference level and the control of the digital test signal of the test signal source 34. This ratio is referred to as output gain. For different application stages and/or frequency ranges, for example, different output gains (actual output amplifications) or, in general, calibration data, can be stored in a lookup table (not shown). These first calibration data comprise data for compensating the deviation of the actual output amplification prevailing according to the situation. Further, the deviations of the actual input amplification are taken into account in these calibration data or generally during calibration.

In order to be able to perform complete calibration of the signal processing device 10 according to the embodiment, the calibration device 30 comprises an input stage calibrator 40 that is implemented to determine deviations of the actual input amplification for each set amplification. The input stage calibrator 40 uses, on the one hand, the existing signal analyzer 38 and additionally comprises a calibration signal source 42 connected to the input of the input stage 12. During calibration of the input stage 12, a calibration signal, for example a chirp signal, is output via the calibration signal source (e.g., noise source, comb generator, chirp signal generator) where the power is approximately known (but does not have to be exactly known). This calibration signal is processed via the input stage 12 and analyzed by the signal analyzer 38. Analogously to the output stage calibrator 32, the input stage calibrator 40 determines the deviations in that it determines, for each amplifier adjustment of the input stage 12, the relative control of the calibration signal digitized by means of the analog-to-digital converter of the input stage 12. Since the power of the calibration signal source 42 is (approximately) known, an analog power level (e.g., in dBm) can be determined for the maximum control of the input stage 12 at each set input amplification.

This value represents the actual input amplification and can be allocated to an input reference level corresponding to a desired or expected analog input level (maximum power of the HF signal 18). Thus, for each set input amplification, an actual input amplification is determined. Further, the connection between analog power level of the calibration signal and the respective digital sample after A/D conversion can be determined. This ratio for each set input value (amplifier adjustment) is referred to as input gain and symbolizes the respective deviation of the input stage 12. Analogously to the above embodiment, the input gain (actual input amplification) can be stored in the lookup table or database together with the input reference level.

In this regard, it should be noted that it is sufficient in practice that the calibration signal of the calibration signal source 42 is only approximately known, since the exact deviations of the overall device, i.e., the output stage 16 and the input stage 12 are determined by means of the output stage calibrator 32 (via the ratio between test signal of the test signal source 34 and the allocated level—output gain—determined by means of the signal analyzer 38). The input reference level is in particular used for adjusting the set amplification of the input stage 12 or to select the same with the aim of obtaining a good control of the analog-to-digital converter of the input stage 12. These input reference levels are used when selecting the set input amplification which is selected in dependence on the level of the HF signal 18 to be processed. It should further be noted that also during determining the deviation between the actual input amplification, the frequency dependency can be considered by the input stage calibrator.

In the following, the above stated values are defined in more detail exemplarily based on formulas, such that the dependency of the same is shown. The signal level applied to the input stage 12 "Pin_analog", e.g. of the HF signal 18 or the calibration signal, is determined by the power spectral density (PST) of the frequency-dependent signal source (noise source (f)) by integration via the input bandwidth. Here, the input bandwidth is typically predetermined and can approximately be determined from the 3 dB bandwidths of the power spectral density in the samples. The power "Pmeasurement means" measured by the signal analyzer 38 is determined, for example by averaging across the squared absolute values of the samples in the signal analyzer. The input gain can be determined based on the two above stated values by division: input gain=Pmeasurement means/Pin_analog. The conversion of the same into the unit dB is performed by the formula Input Gain [dN]=10*log 10 (Input Gain).

Figure 1B:
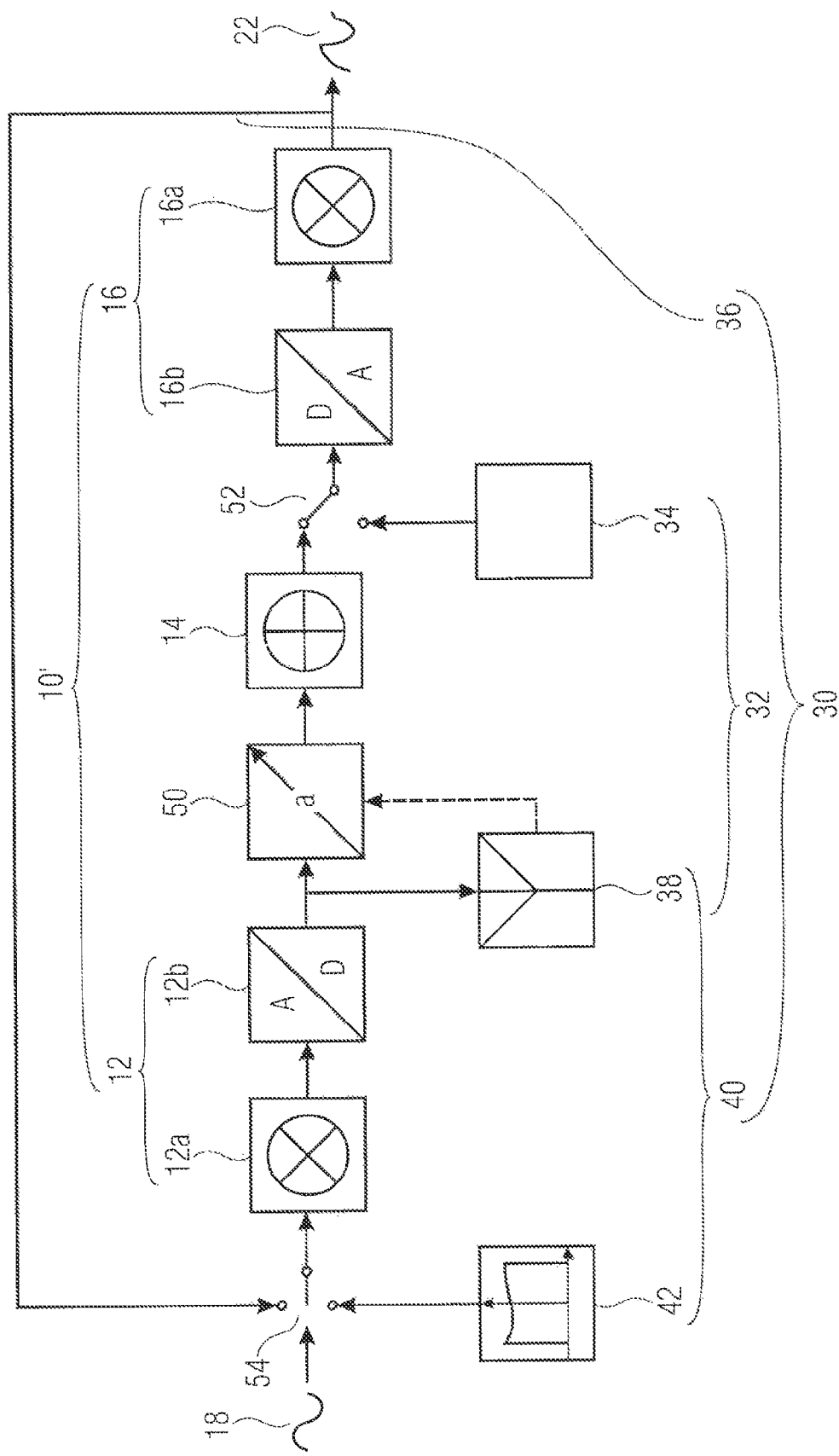
FIG. 1b is a schematic block diagram of a calibration device in combination with a signal processing device according to embodiments.

With reference to FIG. 1*b*, a combination of the calibration device 30 and signal processing device 10 will be discussed, in particular with focus on the compensation of the deviations within the signal path between input stage 12 and output stage 16.

FIG. 1*b* shows the calibration device 30 with the output stage calibrator 32 and the input stage calibrator 40 in combination with a signal processing device 10'. According to an embodiment of FIG. 1*a*, the calibration device 30 includes the calibration signal source 42, the signal analyzer 38, the test signal source 34 as well as the feedback loop 36. This signal processing device 10' includes the input stage 12 comprising an amplification element 12*a* and an analog-to-digital converter 12*b*, the signal processing stage 14 and the output stage 16 comprising a digital-to-analog converter 16*b* and an amplification element 16*a*. Here, it should be noted that the adjustable amplification elements 12*a* and 16*a* are analog amplification elements and are thus arranged on the input side in the input stage 12 and on the output side in the output stage 16. Further, the signal processing device 10' comprises a further amplification element 50, here a digital amplification element 50, which is provided between the input stage 12 and the signal processing device 14.

Figure 3:
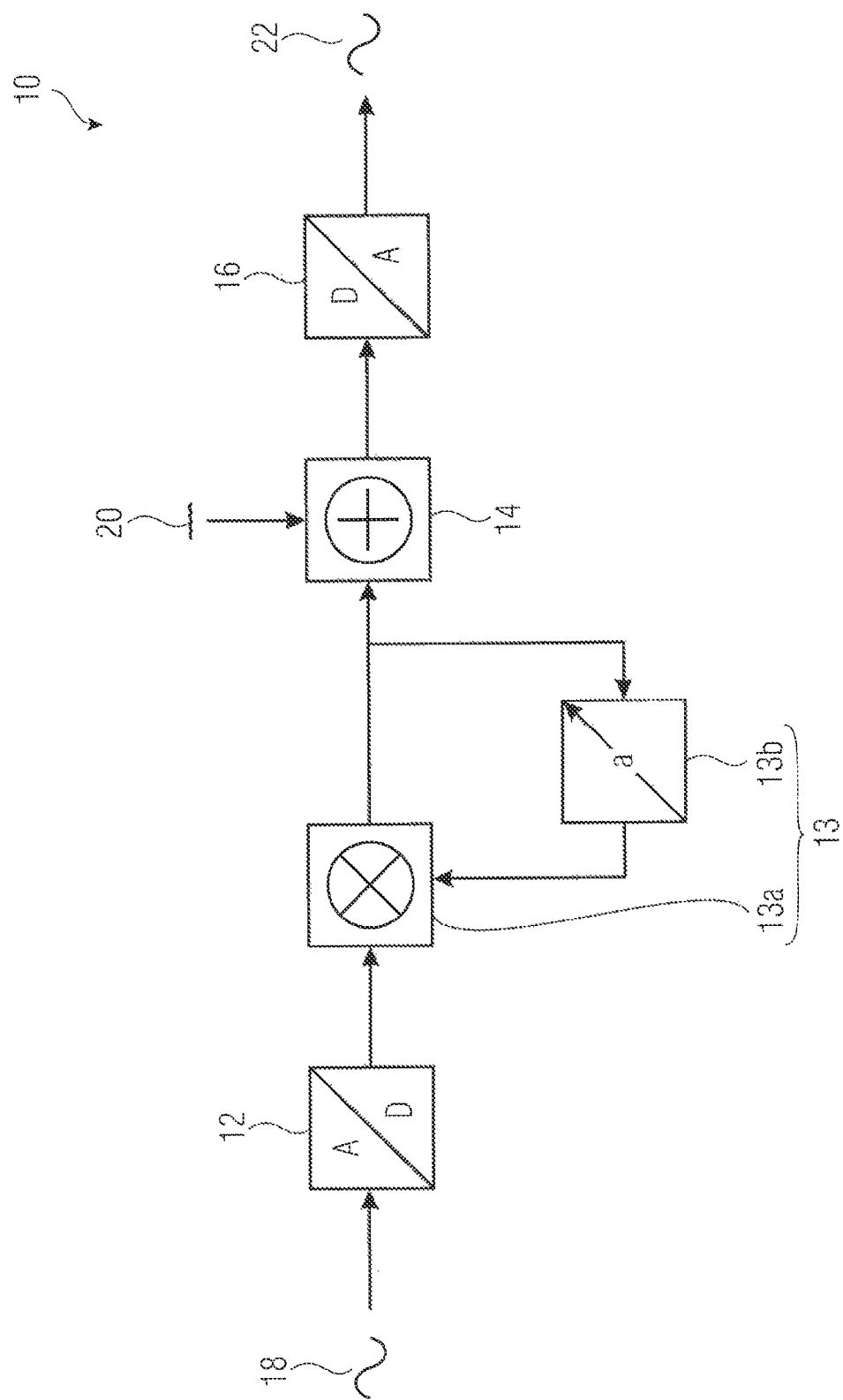
FIG. 3 is a schematic block diagram of a conventional signal processing device.

This amplification element 50 is informationally coupled to the calibration device 30 and can be realized, for example, in the form of a digital mixer (cf. FIG. 3), which is implemented to adapt the digital values representing the analog levels. In this embodiment, the test signal source 34 can be coupled into the signal path of the processing device 10' via a switch 52, wherein the switch 52 is arranged between the signal processing device 14 and the output stage 16. Further, the feedback channel 36 is also implemented in a switchable manner. For this, a further switch 54 is provided at the input of the input stage 12, by means of which the input of the input stage 12 can be selectively coupled either to the feedback path 36, the signal source of the HF signal 18 or the calibration signal source 42.

By means of these two switches 52 and 54, the calibration can be controlled or activated. During activated calibration (cf. calibration mode), the input stage 12 is connected to the calibration signal source 42 by means of the switch 54. In the next step, as described above, the input reference level and the actual input amplification or the input gain are determined by varying the set input amplification of the amplification element 12*a*. Then, with selected amplification adjustment of the amplification element 12*a*, the input stage 12 is coupled to the feedback channel 36 by means of the switch 54. For determining respective output reference levels (allocation of a set output amplification to a desired analog output level) and the actual output amplification, the output stage 16 is coupled to the test signal source 34 by means of the switch 52. When applying a test signal, then, the output reference level and the actual output amplification or the output gain are determined by varying the set output amplification of the amplification element 16*a*. Regarding the deviations and output reference levels determined in that way, calibration data can be determined and can be stored in a lookup table, which can be arranged, for example, between the signal analyzer 38 and the digital amplification element 50. These calibration data can either exist in combined form or in divided form, wherein the first calibration data set serves to compensate deviations of the output stage 16 and the second calibration set to compensate deviations of the input stage 12. Based on these calibration data, an amplification factor or also attenuation factor can be determined, based on which the digital signal in the signal path between input stage 12 and signal processing stage 14 is adapted such that the deviations of the input and output stage 16 can be compensated. Apart from the compensation of the deviations, the amplification element 50 also serves to adapt the transmission signal according to a transmission amplification (carrier gain). For this purpose, the amplification element 50 is provided with a correction signal, according to which the deviations are compensated, and an optional transmission amplification signal.

Figure 2:
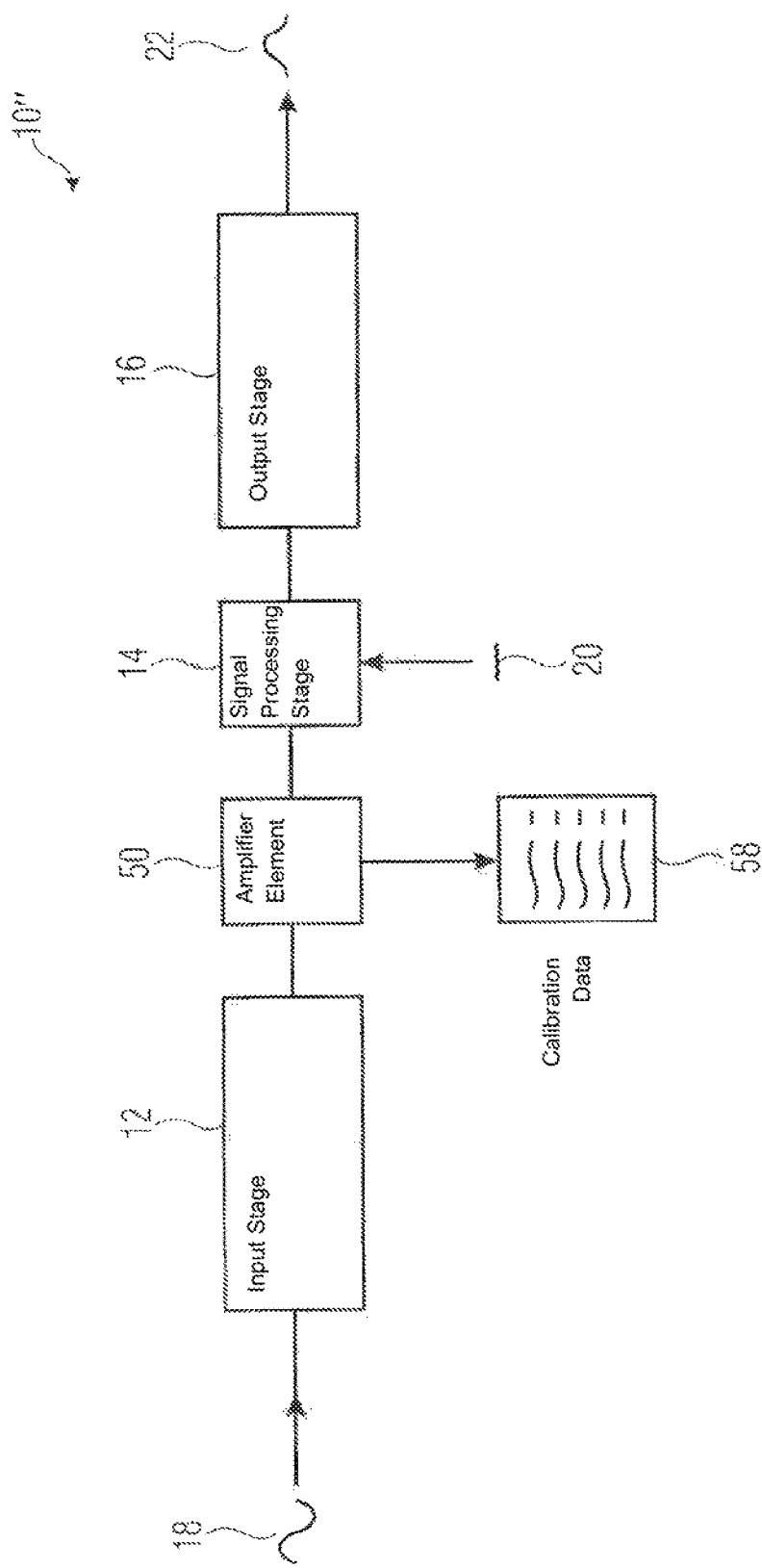
FIG. 2 is a schematic block diagram of a signal processing device according to an embodiment.

This calibration mode can either be performed prior to the operation of the signal processing device 10', automatically when switching on the signal processing device 10' by means of auto-calibration or by the factory. With reference to FIG. 2, a further signal processing device 10" is discussed, where factory calibration has been performed.

FIG. 2 shows the signal processing device 10" which includes the input stage 12, the output stage 16, the signal processing stage 14 and the amplifier element 50 arranged between the input stage 12 and the signal processing stage 14. Further, the signal processing device 10" comprises calibration data 58, which are stored, for example, in the memory. These calibration data 58 exist in the form of a lookup table (for example as database or lookup table of the output gain for each amplifier adjustment of the output stage 16), such that the correct calibration data 58 can be selected in dependence on the current signal processing task. The signal processing task depends in particular on the frequency of the HF signal 18, the level and the set input amplification of the input stage 12 connected to that level. Further, the calibration data are selected in dependence on the set output amplification of the output level 16, which again depends on the desired simulated signal 22 and the manipulation signal 20 added by means of the signal processing device 14.

During operation, based on the calibration data 58 stored in the database or, more accurately, based on the input reference levels (e.g., by using a software), a suitable set input amplification, and based on the output reference level, a suitable set output amplification are selected. Here, operation is facilitated by a user interface (not shown) which is informationally connected to the calibration data memory 58 of the signal processing device 10" and configures the signal processing device 10" as a result of user interaction. The user interface, which can be realized, for example, in the form of a computer program, queries the user for input reference level, output reference level and carrier gain (transmission amplification, additionally desired amplification or attenuation of the (payload) signal between HF input and HF output), and calculates the respective amplifier adjustment of the input stage 12, the output stage 16 and the amplification implement 50 by means of the previously determined calibration data 58. Based on the set input amplification determined by means of the input reference level, the allocated input gain is determined by the user interface. In a next step, with the help of the calibration data 58 and the output reference level stored within the same, a suitable set output amplification is selected for each user input. The same depends on the maximum power which the user wishes to be output at the output of the signal processing device 10". Here, apart from the (amplified) payload signal, the user interface also considers the spurious signals 20 added by the same, for example noise or signals from an arbitrary generator. Based on the set output amplification, determining the allocated output gain is performed automatically by means of the calibration data 58. By combining the determined input gain and output gain, the amplification of the digital payload signal by the amplification element 50 is defined under consideration the carrier gain desired by the user. Thus, the carrier gain determines a level ratio between the digitized input signal and the manipulation signal 20. Also, both amplification and attenuation of the digitized input signal can be performed by the amplification element 50. Since the transmission device 10" optionally also performs band limiting, the carrier gain relates to the frequency or the frequency range with maximum amplification. As a consequence, the amplification element or composition component 50 amplifies the payload signal according to the carrier gain, wherein both the deviations of the actual output amplification and the actual input amplification are compensated. By means of a control display, the user can be informed about the actual control on the input and output side. Since in this concept the amplification is determined based on the calibration data 58 according to the user input, and not automatically readjusted as in FIG. 3, interferences due to the amplification adjustment are avoided. Further, the amplification (carrier gain) for the payload signal remains constant, even when the set input and/or set output amplification (input or output reference level) are changed. Based on the calibration data and the selected set input amplification or set output amplification, the behavior of the signal processing device 10' is traceable and hence predictable for the user.

According to further embodiments, the signal processing device 10" can comprise a terminal between the input stage 12 and the amplification element 50 for the signal analyzer, a coupling device (cf. switch 52 of FIG. 1b) for a test signal source between the signal processing stage 14 and the output stage 16 as well as terminals for a feedback channel for a calibration signal source, such that the above described calibration device 30 can be connected to the signal processing device 10".

With reference to the signal analyzer 38 of FIGS. 1a and 1b it should be noted that the same can also be used for determining the level of the HF signal 18, such that based on the determined level, the set input amplification of the input stage 12 can be set automatically. When determining the level of the HF signal 18, the set input amplification can be changed until the signal analyzer 38 determines a level which lies within the control range typically defined by the analog-to-digital converter of the input stage 12.

As already stated above, for an amplifier adjustment of the input stage 12, i.e., for the correct selection of the set input amplification, the input reference level is used. Here, control reserves for HF signals 18 with non-constant envelope can be considered. Further, other safety factors can be considered, since the ratio between maximum signal and average signal (peak to average ratio) of the HF signal 18 is typically not known when selecting the amplifier adjustment. Analogously, these safety factors and/or control reserves can be considered in the output reference levels.

Thus, concerning the embodiment for storing the calibration data, it should be noted that the above stated safety factors or control reserves are stored together with the input reference level and the output reference level.

With respect to FIG. 1b, it should be noted that the amplification element does not necessarily have to be realized as described above in a digital manner by means of a mixer adding a correction signal, but also other means, such as an analog amplification element can be used for amplifier adjustment.

Further, it should be noted that the user interface of the transmission device 10" can be connected to an optional signal analyzer, such that determining the level of the applied HF signal 18 and hence the determination of the input reference level can be performed automatically.

While some aspects have been described in the context of a device or apparatus, it is obvious that these aspects also represent a description of the respective method for calibrating and operating the signal processing device 10, 10' and 10", such that a block or a component of an apparatus can also be considered as a respective method step or feature of a method step. Analogously, aspects that have been described in the context of or as a method step also represent a description of a respective block or detail or feature of a respective apparatus. Some or all method steps can be performed by a hardware apparatus (by using a hardware apparatus, such as a microprocessor, a programmable computer or an electronic circuit). In some embodiments, some or all of the important method steps can be performed by such an apparatus.

Depending on specific implementation requirements, embodiments of the invention can be implemented in hardware or in software. Implementation can be performed by using a digital memory medium such as a floppy disk, a DVD, a Blu-Ray disk, a CD, an ROM, a PROM, an EPROM, an EEPROM or FLASH memory, a hard drive or any other magnetic or optical memory on which electronically readable control signals are stored that can cooperate or cooperate with a programmable computer system such that the respective method is performed. Thus, the digital memory medium can be computer-readable.

Thus, some embodiments according to the invention comprise a data carrier comprising electronically readable control signals that are able to cooperate with a programmable computer system such that one of the methods described herein is performed.

Generally, embodiments of the present invention can be implemented as a computer program product having a program code, wherein the program code is effective to perform one of the methods when the computer program product runs on a computer.

The program code can, for example, also be stored on a machine-readable carrier.

Other embodiments comprise the computer program for performing one of the methods described herein, wherein the computer program is stored on a machine-readable carrier.

In other words, an embodiment of the inventive method is a computer program comprising a program code for performing one of the methods described herein when the computer program runs on a computer.

Thus, a further embodiment of the inventive method is a data carrier (or digital memory medium or computer readable medium), wherein the computer program for performing one of the methods described herein is recorded.

Thus, a further embodiment of the inventive method is a datastream or a sequence of signals representing the computer program for performing one of the methods described herein. The datastream or the sequence of signals can, for example, be configured such as to be transferred via a data communication connection, for example, via the Internet.

A further embodiment comprises a processing means, for example a computer or programmable logic device that is configured or adapted to perform one of the methods described herein.

A further embodiment comprises a computer on which the computer program for performing one of the methods described herein is installed.

A further embodiment according to the invention comprises an apparatus or a system that is implemented to transmit a computer for performing at least one of the methods described herein to a receiver. This transmission can be performed, for example, electronically or optically. The receiver can, for example, be a computer, a mobile device, a memory device or a similar apparatus. For example, the apparatus or system can include a file server for transmitting the computer program to the receiver.

In some embodiments, a programmable logic device (for example a field programmable gate array, FPGA) can be used to perform some or all functionalities of the methods described herein. In some embodiments, a field programmable gate array can cooperate with a microprocessor to perform one of the methods described herein. Generally, in some embodiments, the methods are performed by means of any hardware apparatus. The same can be universally usable hardware, such as a computer processor (CPU) or hardware specific for the method, such as an ASIC.

While this invention has been described in terms of several advantageous embodiments, there are alterations, permutations, and equivalents which fall within the scope of this invention. It should also be noted that there are many alternative ways of implementing the methods and compositions of the present invention. It is, therefore, intended that the following appended claims be interpreted as including all such alterations, permutations, and equivalents as fall within the true spirit and scope of the present invention.

The invention claimed is:

1. Calibration device for a signal processing device comprising an input stage, a signal processing stage and an output stage, comprising:
    an output stage calibrator comprising a test signal source adapted to be coupled to the output stage, a feedback channel connectable between output of the output stage and input of the input stage, and a signal analyzer adapted to be coupled to the input stage,
    wherein the test signal source is implemented to provide a test signal to the output stage, which can be supplied to the input stage via the feedback channel after processing by the output stage,
    wherein the signal analyzer is implemented to analyze the test signal after processing by the input stage and to determine, based on the analysis, deviations of an actual output amplification of the output stage at a set output amplification of the output stage and/or deviations of an actual input amplification of the input stage at a set input amplification of the input stage,
    wherein the calibration device comprises an input stage calibrator, which comprises a calibration signal source adapted to be coupled to the input of the input stage and the signal analyzer adapted to be coupled to the input stage,
    wherein the calibration signal source is implemented to provide a calibration signal to the input stage,
    wherein the signal analyzer is implemented to analyze the calibration signal after processing by the input stage and determine, based on the analysis, deviations of an actual input amplification of the input stage at a set input amplification of the input stage.

2. Calibration device according to claim 1, wherein, based on the deviations of the actual output amplification at the set output amplification, first calibration data can be determined, based on which the deviations of the actual output amplification at the set output amplification can be compensated by means of an amplification element of the signal processing device.

3. Calibration device according to claim 1, wherein the output stage calibrator is implemented to determine the deviations in dependence on a differently selected set input amplification of the input stage and/or the set output amplification of the output stage.

4. Calibration device according to claim 1, wherein the output stage calibrator is implemented to determine the deviations in dependence on different frequencies of an HF signal to be processed.

5. Calibration device according to claim 1, wherein the output stage calibrator is implemented to consider, during the analysis of the deviations of the actual output amplification at the set output amplification, deviations of an actual input amplification of the input stage at a set input amplification of the input stage.

6. Calibration device according to claim 1, wherein the test signal output by the test signal source is a known alternating signal, sinusoidal signal or continuous signal.

7. Calibration device according to claim 1, wherein the signal analyzer is implemented to determine a signal level of a signal output by the input stage.

8. Calibration device according to claim 1, wherein, based on the deviations of the actual input amplification at the set input amplification, second calibration data can be determined, based on which the deviations of the actual input amplification at the set input amplification can be compensated by means of an amplification element of the signal processing device.

9. Calibration device according to claim 2, comprising a memory with a look-up table where the first and/or further calibration data can be stored.

10. Calibration device according to claim 2, comprising the amplification element that is implemented to change a digital signal to be processed in the signal processing device according to the first calibration data and/or according to further calibration data, or to superimpose the same with a correction signal, such that the deviations of the actual output amplification at the set output amplification and/or further deviations are compensated.

11. Calibration device according to claim 7, wherein the output stage calibrator is implemented to automatically determine the deviations of the actual output amplification at the set output amplification, after having determined, by means of the input stage calibrator, the deviations of the actual input amplification at the set input amplification, and
wherein the calibration device is implemented to calculate, based on the deviations of the actual output amplification at the set output amplification and the deviations of the actual input amplification at the set input amplification, combined calibration data, based on which the deviations of the actual output amplification and the actual input amplification can be compensated by means of an amplification element of the signal processing device.

12. Calibration device according to claim 11, wherein the signal analyzer is implemented to determine a signal level of an HF signal to be processed, and wherein the calibration device is implemented to determine the set input amplification based on the determined signal level.

13. Method, performed by a calibration device, for calibrating a signal processing device comprising an input stage, a signal processing stage and an output stage, comprising:
calibrating the output stage with the substeps providing a test signal to the output stage, returning the test signal to the input stage after processing by the output stage and analyzing the test signal after processing by the input stage to determine deviations of an actual output amplification of the output stage at a set output amplification of the output stage and/or deviations of an actual input amplification of the input stage at a set input amplification of the input stage,
wherein the method comprises the step of calibrating the input stage prior to calibrating the output stage,
wherein calibrating the input stage comprises the substeps of providing a calibration signal to the input stage and analyzing the calibration signal after processing by the input stage, in order to determine deviations of an actual input amplification of the input stage at a set input amplification of the input stage,
wherein the deviations of the actual input amplification are considered in the step of calibrating the output stage.

14. Method according to claim 13 which is repeated for each selected set input amplification of the input stage and/or for each frequency range of an HF signal to be processed.

15. Method according to claim 13 comprising the step of changing the HF signal to be processed according to a transmission amplification selected via the user interface.

16. Computer program embodied on a non-transitory computer-readable medium and comprising a program code for performing, when the program runs on a computer, a method performed by a calibration device, for calibrating a signal processing device comprising an input stage, a signal processing stage and an output stage, the method comprising:
calibrating the output stage with the substeps providing a test signal to the output stage, returning the test signal to the input stage after processing by the output stage and analyzing the test signal after processing by the input stage to determine deviations of an actual output amplification of the output stage at a set output amplification of the output stage and/or deviations of an actual input amplification of the input stage at a set input amplification of the input stage,
wherein the method comprises the step of calibrating the input stage prior to calibrating the output stage,
wherein calibrating the input stage comprises the substeps of providing a calibration signal to the input stage and analyzing the calibration signal after processing by the input stage, in order to determine deviations of an actual input amplification of the input stage at a set input amplification of the input stage,
wherein the deviations of the actual input amplification are considered in the step of calibrating the output stage.

* * * * *